D. J. MARSTON.
Wheels for Vehicles.

No. 134,152.  Patented Dec. 24, 1872.

Witnesses
S. N. Piper
L. N. Möller

Dudley J. Marston.
by his attorney.
R. H. Eddy

UNITED STATES PATENT OFFICE.

DUDLEY J. MARSTON, OF AMESBURY, MASSACHUSETTS.

IMPROVEMENT IN WHEELS FOR VEHICLES.

Specification forming part of Letters Patent No. 134,152, dated December 24, 1872.

*To all whom it may concern:*

Be it known that I, DUDLEY J. MARSTON, of Amesbury, of the county of Essex and State of Massachusetts, have invented a new and useful Improvement in Carriage-Wheels; and do hereby declare the same to be fully described in the following specification and represented in the accompanying drawing, of which—

Figure 1:
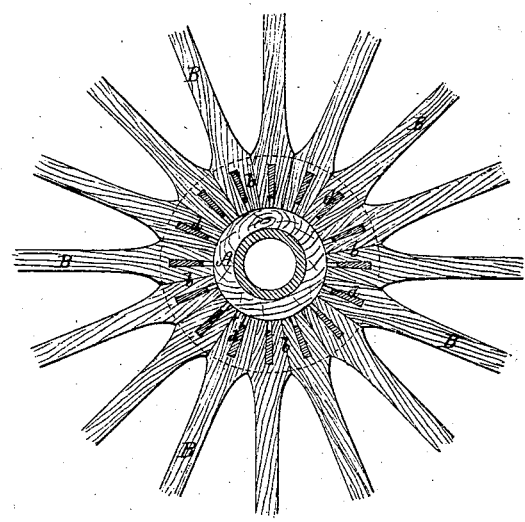
Figure 2:
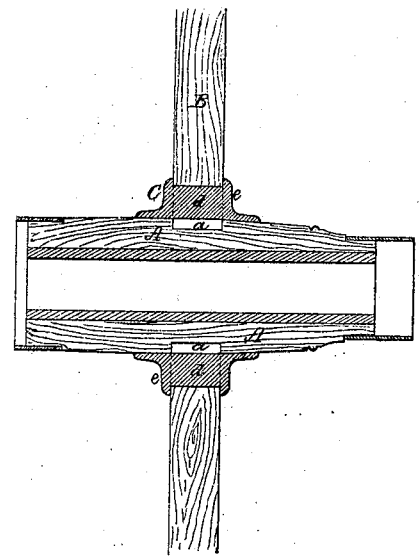
Figure 4:
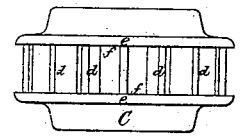
Figure 3:
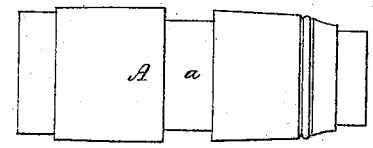
Figure 5:
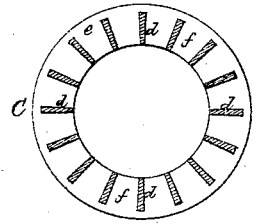
Figure 6:

Figure 1 denotes a longitudinal section; Fig. 2, a transverse section of a carriage-wheel hub and spokes constructed and connected in accordance with my invention; Fig. 3 is a top view of the wooden hub; Fig. 4, a top view; Fig. 5, a longitudinal section of the metallic spoke-supporter; and Fig. 6 is a side view of one of the spokes, showing its forked or furcated head.

The spokes and hub and spoke-supporter, when put together in manner as hereinafter explained, so mutually support one another as to require no bolts to go through them in order to hold them in connection.

The wooden hub A, formed as shown, is provided at or near its middle with a groove, $a$, extending circumferentially around it, such groove being to receive the heads $b$ of the spokes B. Each of such spokes has a furcated head, $b$—that is, a head slotted transversely, as shown at $c$ in Fig. 6, such slot being to receive and straddle one of the wedge-formed connections $d$ of the spoke-supporter C. The said spoke-supporter C consists of two metallic rings, $e\ e$, having flat inner faces $f\ f$, and being connected by a series of wedge-formed connections or cross-bars, $d$, arranged to radiate from the common axis of the rings, and extended from the bearing-face of one ring to that of the other. The two rings and their connections $d$ are to be cast in one piece, and constitute the spoke-supporter C.

After the spoke-supporter may have been driven into place upon the hub, so as to have the groove $a$ in prolongation of the space between the two rings of the said spoke-supporter, the spokes, having cement or glue placed upon their heads and in the slots thereof, are to be driven successively upon the several connections or parts $d$ of the metallic spoke-supporter C. In doing this the heads of the spokes will be contracted upon the wedge-form connections, and made to bear against one another in such a manner as to cause them to be held in place with great firmness. The several spokes are also to be driven down closely into the groove $a$, which serves to hold them and the spoke-supporter in due relations with the hub, no bolts being required to complete the conjunction of the parts.

By this mode of constructing the hub, the spokes, and metallic spoke-supporter, a wheel of great strength and durability may be made, when the felly is fixed to the spokes and tired in the usual way.

From the above it will be seen that an important feature of my invention is the wooden part A with its groove $a$; another important feature being the metallic spoke-supporter C, having its connections $d$ of a dovetailed form in transverse section. Furthermore, the spokes, where they enter supporter C, are tapering and furcated, as shown in Fig. 6. Thus, in my wheel-hub the groove $a$ and the spokes, or parts thereof which enter the groove, act to hold the supporter in place on the wooden part A, the dovetailed form of the parts $d$ of the supporter enabling the spokes, while being driven into the supporter, to contract upon such parts $d$, whereby they are caused to operate to great advantage in holding the spokes in place.

I claim as my invention—

The combination of the grooved hub A, the furcated spokes B, and the metallic spoke-supporter C, all being constructed and arranged substantially in manner as described and represented.

DUDLEY J. MARSTON.

Witnesses:
 R. H. EDDY,
 J. R. SNOW.